Dec. 14, 1954          E. L. RICHARDSON          2,696,893
ELECTROSTATIC PRECIPITATOR
Filed Oct. 1, 1952

Inventor:
Earl L. Richardson
by Robert T. Palmer
Attorney

United States Patent Office 2,696,893
Patented Dec. 14, 1954

2,696,893

ELECTROSTATIC PRECIPITATOR

Earl L. Richardson, Hyde Park, Mass., assignor to Westinghouse Electric Corporation, East Pittsburgh, Pa., a corporation of Pennsylvania Application October 1, 1952, Serial No. 312,579

4 Claims. (Cl. 183—7)

This invention relates to electrostatic precipitators, and has as an object to reduce the manufacturing cost of such precipitators.

A typical electrostatic precipitator for cleaning air for ventilation usually has a metal cabinet in which a collector cell is slidably positioned with a separate ionizer in the inlet of the cabinet. Insulators are required for insulatedly supporting the ionizer wires, and separate insulators are required for supporting the high voltage collector plates of the collector cell. The cost of such a precipitator prevents its use in many locations where there is need for the electrostatic cleaning of air.

This invention reduces the cost of such a precipitator by using a pair of opposed side walls of electric insulating material which support the high voltage collector plates and the ionizer wires, and by using a pair of opposed side walls of metal which extend at right angles to the side walls of insulating material, and which have portions which overlap the side walls of insulating material for supporting the grounded collector plates, and which support a metal screen or perforated plate used as the grounded ionizer electrode.

Figure 1:
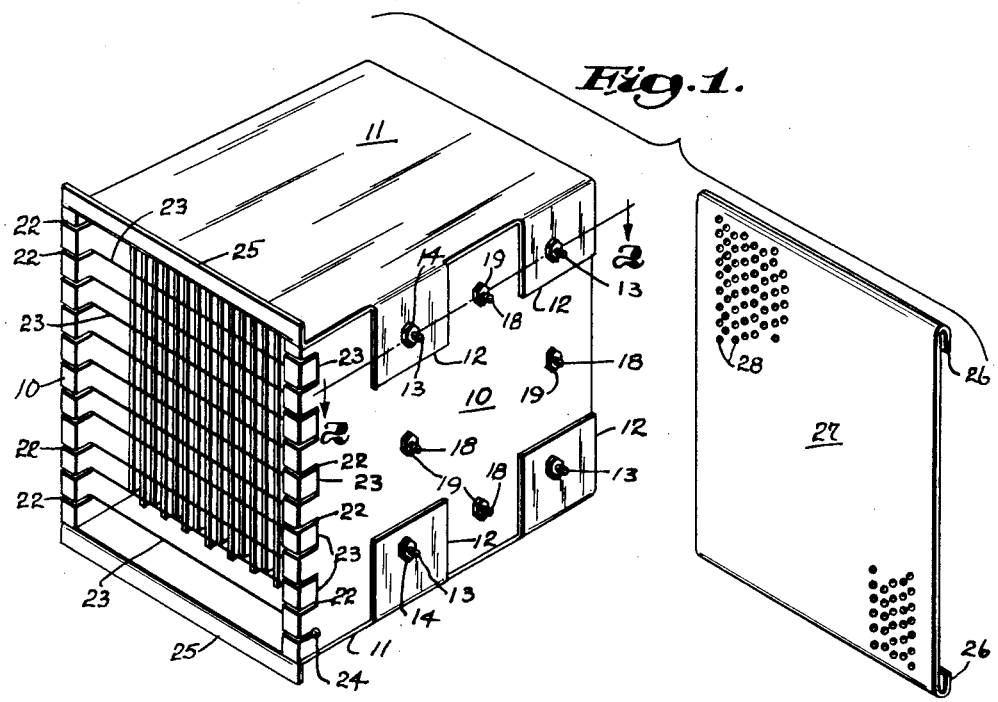
Figure 2:
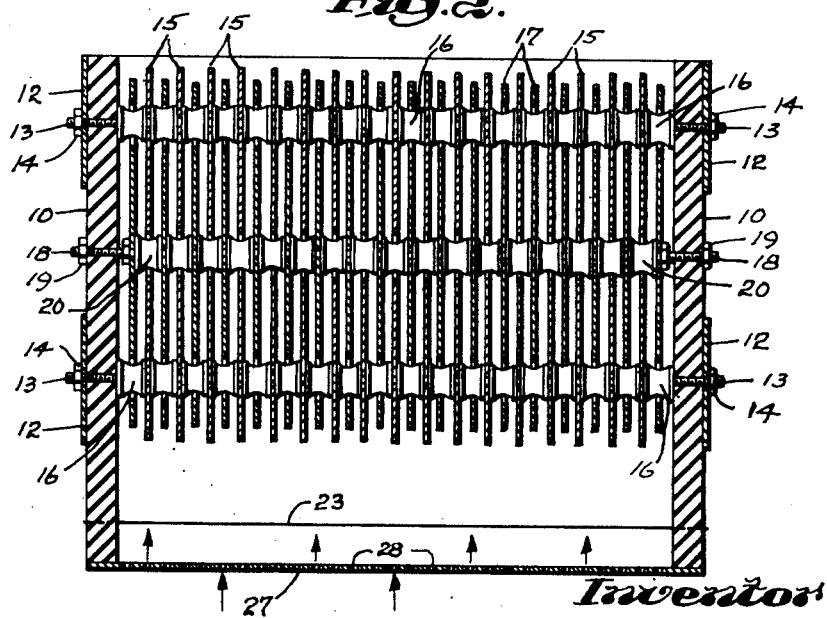

The invention will now be described with reference to the drawings, of which:

Fig. 1 is a projected assembled view of an electrostatic precipitator embodying this invention, with a perforated baffle plate serving as the ionizer electrode removed and shown alongside the remainder of the assembly, and Fig. 2 is a sectional view along the lines 2—2 of Fig. 1.

The rectangular precipitator illustrated by Figs. 1 and 2 of the drawings, has the two vertical side walls 10 of electric insulating material such as "Formica" or "Bakelite," and has the top and bottom walls 11 of metal. The metal walls 11 have the flanged portions 12 extending perpendicular thereto and in contact with the walls 10 of insulation.

The tie rods 13, threaded at their ends, extend through the walls 10 and wall portions 12 and are secured in place by the nuts 14. The tie rods 13 support the metal grounded collector plates 15 through which the tie rods extend, the plates 15 being spaced apart by the metal spacers 16 on the tie rods.

The metal high voltage collector plates 17 have clearance openings therein through which the spacers 16 pass, and are supported on the tie rods 18 which extend through the side walls 10, and are held in place by the nuts 19 secured on their threaded ends. The plates 17 are spaced apart by the metal spacers 20 on the tie rods 18. The grounded plates 15 have clearance openings through which the spacers 20 extend.

The upstream ends of the walls 10 of insulation have a plurality of spaced apart, horizontally extending slits 22 therein, corresponding slits in the two walls 10 being horizontal alignment. A wire 23 is interlaced in the slits 22 and forms in effect a plurality of ionizer wires, eleven in the embodiment of the invention illustrated by the drawings. The ends of the wire have the beads 24 attached for holding the wire passes in the slits.

The front ends of the metal walls 11 have the vertical flanges 25 formed therein above the upper wall and below the lower wall, and over which the turned-over portions 26 of the perforated baffle sheet 27 extend for slidably positioning the sheet 27 upstream of the ionizer wire where it serves as the grounded, non-discharging ionizer electrode. The sheet 27 contains the closely spaced circular holes 28, and serves not only as the usual baffle sheet for providing uniform air flow across the face of the ionizer but as the non-discharging electrode of the ionizer.

The wire 23 and the collector plates 17 would, in operation, be connected to a positive high voltage terminal of a conventional power pack, while the metal walls 11, and through them, the collector plates 15 and the baffle sheet 27 would be connected to ground and to the negative terminal of the power pack.

In operation, a conventional fan which is not illustrated, would move the air to be cleaned between the ionizer wire 23 and the baffle sheet 27 where it would be ionized and positive electrostatic charges added to the dust particles entrained in the air. The air with the charged dust particles would then pass between the plates 15 and 17 where the electrostatic fields between adjacent plates would cause the positively charged dust particles to deposit upon the grounded collector plates 15.

While one embodiment of the invention has been described for the purpose of illustration, it should be understood that the invention is not limited to the exact apparatus and arrangement of apparatus illustrated, since modifications thereof may be suggested by those skilled in the art without departure from the essence of the invention.

What I claim as my invention, is:

1. An electrostatic precipitator comprising a pair of parallel spaced-apart side walls of electric insulation, tie rods extending into said walls, a first plurality of collector plates supported on said rods, a pair of spaced-apart metal side walls extending at right angles to said first mentioned side walls, said metal walls having portions bent over against said side walls of insulation and spaced from said tie rods, other tie rods extending through said side walls of insulation and said portions, and a second plurality of collector plates interspersed with said first mentioned collector plates supported on said other tie rods, the plates of said second plurality having clearance openings through which the first mentioned tie rods pass, and the plates of said first plurality having clearance openings through which said other tie rods pass.

2. An electrostatic precipitator as claimed in claim 1 in which the upstream ends of said walls of insulation have a plurality of slits therein, and in which an ionizer wire is interlaced in a plurality of passes.

3. An electrostatic precipitator as claimed in claim 2 in which a perforated metal baffle sheet forming a non-discharging ionizer electrode is supported on said metal wall upstream of said wire.

4. An electrostatic precipitator as claimed in claim 3 in which the baffle sheet has oppositely disposed bent over portions fitted slidably over flanges extending perpendicular to said metal walls.

References Cited in the file of this patent

UNITED STATES PATENTS

| Number | Name | Date |
|---|---|---|
| 2,504,430 | Lincoln | Apr. 18, 1950 |